United States Patent [19]
Blount

[11] 3,988,789
[45] Nov. 2, 1976

[54] RESILIENT SEATS AND COVER LIDS THEREFOR FOR WATER CLOSETS

[75] Inventor: George W. Blount, Hamilton, Ohio

[73] Assignee: New Century Products, Inc., Middletown, Ohio

[22] Filed: Sept. 13, 1972

[21] Appl. No.: 288,730

[52] U.S. Cl. .................................. 4/234; 4/236; 264/45.5
[51] Int. Cl.² .................. A47K 13/02; B32B 5/18
[58] Field of Search .................... 264/45, 45.5, 45.6; 16/128, DIG. 13; 4/234–237, 242, DIG. 8; 156/267

[56] References Cited
UNITED STATES PATENTS

| | | | |
|---|---|---|---|
| 2,155,286 | 4/1939 | Winding | 4/234 |
| 2,966,686 | 1/1961 | Beneke, Jr. | 4/234 |
| 3,331,085 | 7/1967 | Potosky | 4/242 |
| 3,513,050 | 5/1970 | Samuels et al. | 4/237 |
| 3,517,396 | 6/1970 | Wert | 4/234 |
| 3,520,005 | 1/1970 | Downes | 4/234 |
| 3,590,401 | 7/1971 | Brown | 4/236 |
| 3,623,931 | 11/1971 | Hosen | 264/45 |
| 3,671,981 | 6/1972 | Smith | 4/242 |
| 3,708,367 | 1/1973 | Grant et al. | 156/267 |
| 3,772,111 | 11/1973 | Ginsburg | 264/45 |
| 3,863,277 | 2/1975 | Harrison | 4/237 |

Primary Examiner—Richard E. Aegerter
Assistant Examiner—Stuart S. Levy
Attorney, Agent, or Firm—James W. Pearce; Roy F. Schaeperklaus

[57] ABSTRACT

A resilient synthetic resin toilet seat which includes a preformed stiffening portion having an internal foamed core. The core is enveloped in an infoamed self-skin. A cushioning portion is molded thereon and has an internal foamed core enveloped in a tough but resilient self-skin unitarily extending from the top and sides of said stiffening portion. A resilient synthetic resin toilet seat lid having an internal foamed core enveloped in an unfoamed skin, a method of making the seat and lid by molding, as well as molds for use in such molding, are also disclosed.

21 Claims, 15 Drawing Figures

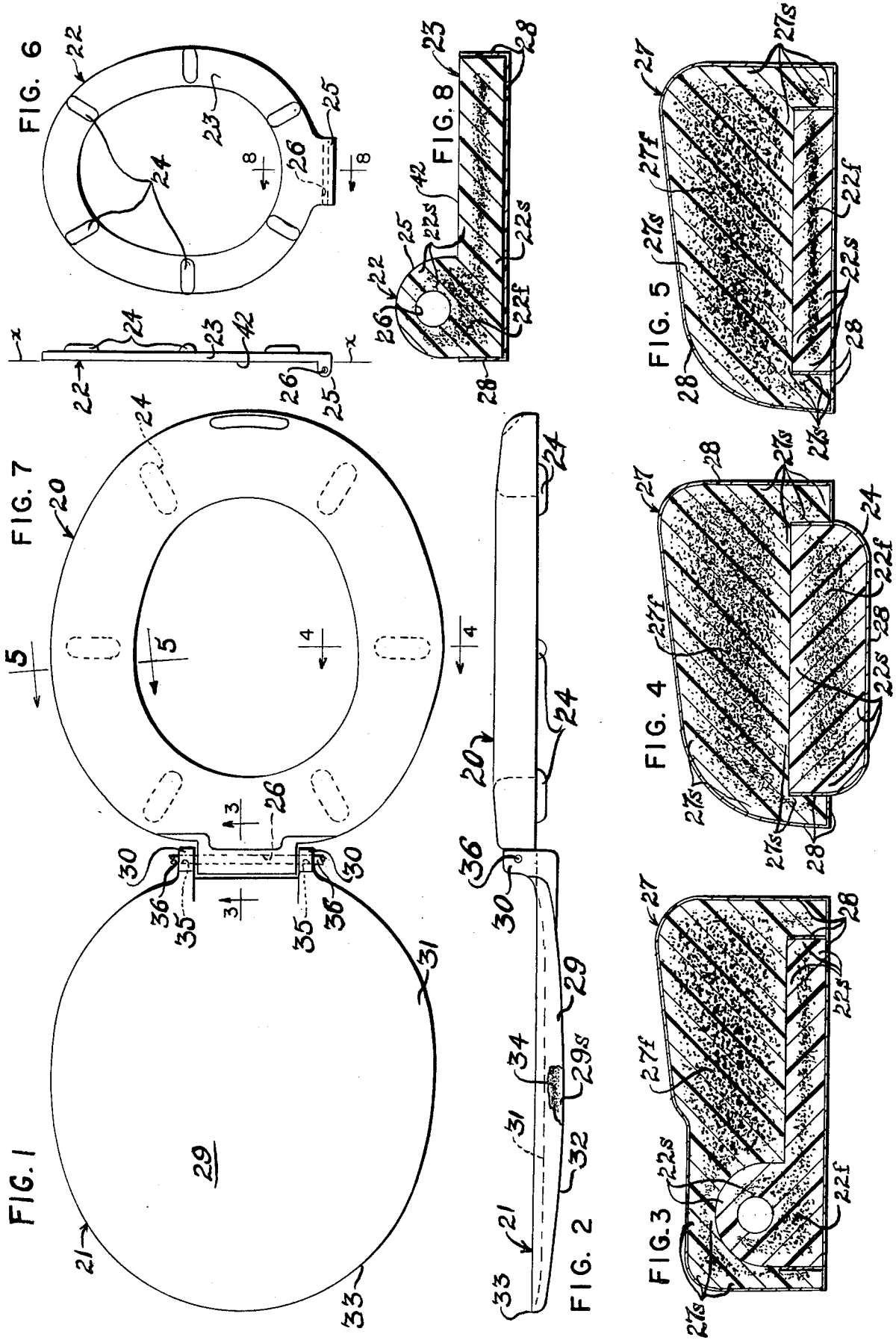

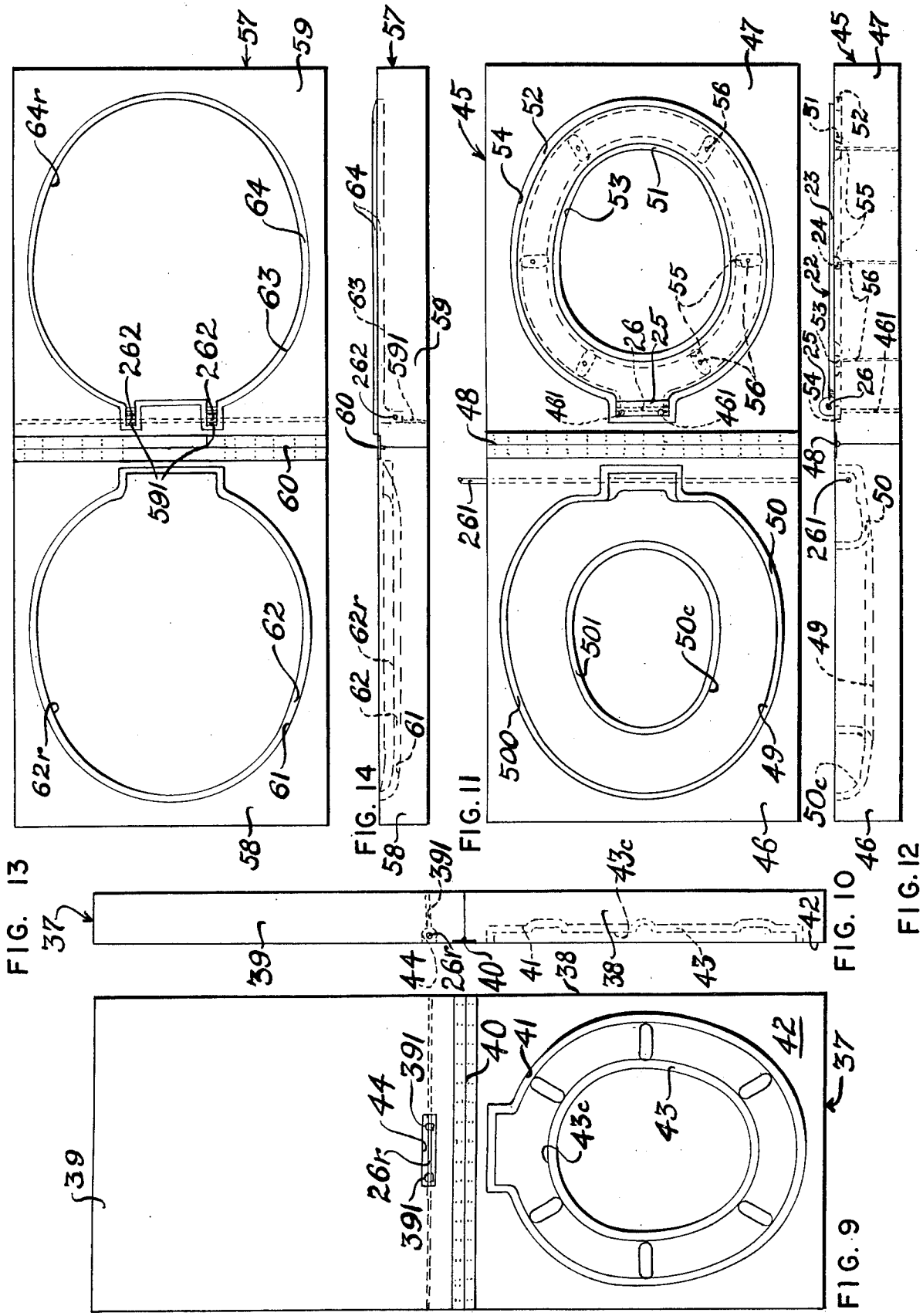

RESILIENT SEATS AND COVER LIDS THEREFOR FOR WATER CLOSETS

This invention relates to resilient seats and cover lids therefor for water closets or the like, and, more particularly, to molded unitary cushioned seats and lids.

Another object of this invention is to provide toilet seats of the above character having a stiff but resilient and flexible bottom portion, the top and sides of which are surrounded by foam cushioning having a tough dense self-skin bonded to the top and edge surfaces of the bottom portion and forming a unitary seat.

Another object of this invention is to provide toilet seats of the above character with exterior surface of color and texture as desired.

Another object of this invention is to provide toilet seats of the above character molded of urethane resin.

Another object of this invention is to provide toilet seats of the above character having bacteriostat and fungistat substances incorporated therein.

Another object of this invention is to provide toilet seats of resilient construction which change in cross-section so as to present increasing area of load supporting contact with reduction in the area of the opening in the seat in response to application of increasing load to be supported.

Another object of this invention is to provide for toilet seats, lids of tough but resilient integral construction having a foamed cushion central internal portion in a dense self-skin, which skin also forms dense flexible margin areas.

Another object of this invention is to provide for toilet seats, lids of the above character with exterior surface of color and texture as desired.

Another object of this invention is to provide for toilet seats, lids molded of urethane resin.

Another object of this invention is to provide for toilet seats, lids of the above character having bacteriostat and fungistat substances incorporated therein.

Another object of this invention is to provide a method for molding toilet seats and lids of the above character.

Another object of this invention is to provide molds for molding toilet seats and lids of the above character.

The above and other objects and features of the invention will be apparent to those having ordinary skill in the art to which this invention pertains, from the following detailed description and the drawings, in which:

FIG. 1 is a plan view of a toilet seat and lid constructed in accordance with what presently appears to be a preferred embodiment of this invention, the seat being shown from above when in the horizontal position in which it is customarily used, while the lid is shown as if viewed from above when swung substantially 180° from the position in which it would rest upon the seat to cover the upward surfaces thereof;

FIG. 2 is a side view in elevation of the seat and lid shown in FIG. 1, a portion of which is broken away to show details of construction;

FIG. 3 is a veiw in transverse section of the seat taken along the line 3—3 in FIG. 1;

FIG. 4 is a view in transverse section of the seat taken along the line 4—4 in FIG. 1;

FIG. 5 is a view in transverse section of the seat taken along the line 5—5 in FIG. 1;

FIG. 6 is a bottom plan view of a preformed stiffening portion which forms a unitary part of the seat shown in FIGS. 1–5;

FIG. 7 is a view in side elevation of the preformed stiffening portion shown in FIG. 6;

FIG. 8 is a view in transverse section of the preformed stiffening portion shown in FIG. 6 taken along the line 8—8 in FIG. 6;

FIG. 9 is a top plan view of a mold, in open condition, for making preformed stiffening portions as are shown in FIGS. 6–8;

FIG. 10 is a view in side elevation of the mold shown in FIG. 9;

FIG. 11 is a top plan view of a mold, in open condition, for use in molding seats illustrated in FIGS. 1 - 5;

FIG. 12 is a side view in elevation of the mold of FIG. 11;

FIG. 13 is a top plan view of a mold, in open condition, for molding toilet seat lids as illustrated in FIGS. 1 and 2;

FIG. 14 is a view in side elevation of the mold of FIG. 13; and

In the following detailed description and the drawings, like reference characters indicate like parts.

Figure 15:
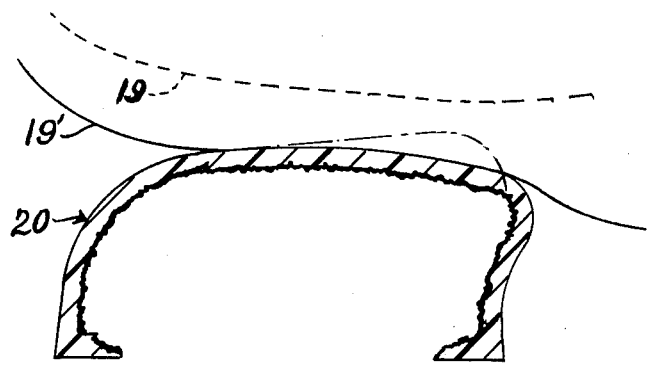
FIG. 15 is a fragmentary view in transverse section, taken like FIG. 5 along the line 5—5 in FIG. 1, but illustrating deformation of the cross-section of the seat under a load.

In FIGS. 1 and 2 is shown a toilet seat 20 in association with a lid 21.

The seat 20 is made in two steps. The bottom portion of the seat, a preformed stiffening portion 22, is molded first and then the additional seat structure is added by a second molding operation in the manufacture of the preferred embodiment shown in the drawings.

The preformed stiffening portion 22, as illustrated in FIGS. 6, 7 and 8, has a main body 23 of an oval configuration in plan view with integral bumper portions 24 projecting from its underside and with a lug portion 25 projecting outwardly and upwardly from the generally circular main portion 23 of the member. Lug portion 25 has a hinge pin receiving aperture 26 for receiving hinge pin portions of toilet seat hinge brackets, for example, pins as shown in U.S. Pat. No. 3,670,441. As shown in FIGS. 3, 4, 5 and 8, the preformed stiffening portion is of varied density in different portions of its cross-section. In the illustrative embodiment, stiffening member 22 is dense and substantially pore free adjacent the surfaces thereof, and to a depth of the order of one-sixteenth (1/16) inch to about three-thirty-seconds (3/32) inch, and such surfaces include not only the exteriorly facing surfaces but the hinge pin receiving bore surface as well. These dense regions adjacent the surface of the member will hereinafter sometimes be referred to as self-skin portions 22s. The other portions 22f of the stiffening preform, inwardly of the self-skin thereof, are of progressively reduced density in locations progressively more remote from the surface of the preform and this variation in the density is produced by foaming of the material in greater or lesser degree during the molding, curing, of the preform. The varying density is illustrated in FIGS. 3, 4, 5 and 8 by stippling which represents foaming so that the more heavily stippled areas are of lesser density while those of unstippled character are of greater density. The cross-sectional views, FIGS. 3, 4, 5 and 8 are representative, and similar self-skin portions 22s and internally foamed portions 22f would also be found in other cross-sections of the member 22.

As noted earlier, preformed stiffening portion 22 is first made as by molding in one mold and then mounted in the second stage mold in which the additional self-skinned resilient cushioning portion 27 of the seat 20 is formed in integral relation to the preformed stiffening portion 22 so as to form a unitized and unitary integral seat 20. As shown in FIGS. 3, 4 and 5, the preformed stiffening portion 22 is provided with cushioning portion 27 which has a dense tough skin 27s adhering to the edges and upper surfaces of the preformed portion and extending to encase the foamed cushioning 27f formed integrally therewith. In FIGS. 3, 4 and 5 stippling is applied to indicate foaming; that is, the denser the stippling the greater the foam or porosity of the cushioning portion 27. The cushioning portion 27 of seat 20 is substantially softer than the stiffening preform portion 22.

The entire seat has on its exterior an integral layer 28 of pigmented material which may be of any color or decorative character as desired, and which is integrally formed with the balance of the seat.

In the preferred embodiment shown in the drawings, the pigmented layer portion 28 covers the under surface of the preformed stiffening portion (including the bumper portions 24) and the edge faces thereof to the right of plane $x-x$ in FIG. 7. Layer 28 also covers the exposed surface of the additional seat structure, cushioning portion 27 added in the secod molding operation so that the seat 20, when completed, has an unbroken pigmented outer layer 28. When a user 19 is in seated position 19' upon seat 20, the seat is deformed to bulge adjacent its inner edge with accompanying increase in area of contact with the user 19 adjacent the bulge, as illustrated in FIG. 15.

The lid 21 for the seat is shown in FIGS. 1 and 2. Lid 21 has an oval body 29 and a pair of integral hinge lugs 30. Hinge pin receiving apertures 35 extend through lugs 30 and are surrounded by part of dense self-skin 29s. The lugs 30 straddle lug portion 25 of a seat and hinge pin means 36 extend through apertures 35 into aperture 26 to secure the seat 20 and lid 21 in hinged relation.

The lid body 29 has a generally concave surface area 31 adapted to rest upon the upper surface of the seat 20 when closed, and a generally convex upper surface area 32. Lid 21 also has a dense essentially non-porous self-skin portion 29s extending inwardly from its surface and, as a result, at and adjacent its edge 33 lid 21 is dense, flexible and non-porous self-skin structure, but the central portion of the lid which is of greater thickness has inwardly spaced from the surface, that is subjacent the self-skin, an internal portion 34 which is porous due to foaming during the molding, curing of the resin. Preferably the central portion of the lid having such foamed character is generally the portion which lies over the opening in the seat when the lid is in closed position. Thus, when a person sits upon the lid while it is in closed position, the lid, with its flexible margins supported on the cushioned portion of the seat, cooperates with the seat to function as a cushioned support.

A mold 37 for making preformed stiffening portions 22 is shown in FIGS. 9 and 10.

Mold 37 has a body 38 and a cover 39 hingedly joined together at 40. Body 38 is formed of epoxy resin and has an oversize cavity 41. A pattern which is a duplicate of the preformed stiffening portion 22, not shown, is supported in the position in which the structure to the left of plane $x-x$ in FIG. 7 is disposed within the oversized cavity 41 and plane $x-x$ coincides with top surface 42 of body 38. The pattern is generally spaced equidistant from the surface bounding cavity 41 by a distance of about three-eighths (⅜) of an inch. The space between the pattern and body 38 is filled with a silicone rubber mold compound which, when set and cured, forms a lining 43, sometimes called a bladder, from which the pattern is removed and which itself is removable from cavity 41, separable from molding made in cavity 43c it defines when supported in place in cavity 41 in body 38. Provided in cover 39, which may also be formed of epoxy resin, is a cavity 44 in which lug 25, the part of preformed stiffener portion 22 to the left of plane $x-x$ in FIG. 7, is molded. The cavities 43c and 44 together form a cavity of the size and shape of the preformed stiffener portion 22 and when mold 37 is closed. To form hinge pin receiving aperture 26 in lug portion 25, a rod 26r is slidably mounted in a bore provided in cover 39 and advanceable into a molding position in which it extends through cavity 44 in the desired location for aperture 26, and retractable so as to be withdrawn from cavity 44 to permit removal of a molding.

A mold 45, for finish molding seats 20, is shown in FIGS. 11 and 12. Mold 45 has a body 46 and a cover 47 joined together by hinge 48.

Body 46 is formed of epoxy resin and has an oversize cavity 49 of the general shape of the finished seat 20. A pattern, not shown, but which is a duplicate of the finished seat 20 less bumper portions 24, is mounted upside down in cavity 49 with the underside of the seat flush with the upper surface of body 46 and the other outer surface of the seat spaced generally equidistant from the surface that bounds cavity 49, that is at a distance of about three-eighths (⅜) of an inch. The space between the pattern and body 46 is filled with a silicon rubber mold compound which, when set and cured, forms a lining 50, sometimes called a bladder, from which the pattern is removed and which itself is both removable from cavity 49 and separable from moldings made in the cavity 50c it defines while supported in place in cavity 49 in body 46.

Cover 47, also formed of epoxy resin, has a pair of ring like silicon rubber members, inner ring member 51 and outer ring member 52, which respectively set in and fill grooves 53 and 54 in cover 47. As shown in FIG. 11, inner ring 51 is so positioned that its inner edge overlappingly contacts and seals against the inner edge 501 of liner 50 when the mold 45 is closed and extends spanwise over cavity 50c toward outer ring 52. Similarly, outer ring 52 is positioned that its outer edge overlappingly contacts and seals against the outer edge 500 of liner 50 when the mold 45 is closed and extends spanwise over cavity 50c toward inner ring 51. Between rings 51 and 52, recesses 55 of appropriate size and location are provided in cover 47 to receive bumper portions 24 of a preformed stiffener portion 22. Fasteners 56 are provided in cover 47 for engaging bumper portions 24 to secure a preformed stiffener portion 22 in position on the cover 47 with its outer edge underlain by the inner portion of outer ring 52 and its inner edge underlain by the outer portion of inner ring 51. A hinge pin aperture forming rod 261 is slidably mounted in a bore in body 46 and, when the mold is closed, advanceable to fill the aperture 26 in the preformed stiffening portion 22 and span portions of the mold cavity adjacent lug portion 25 during molding of a seat 20 and retractable from a cured molding in the mold so as to permit removal of the molding.

A mold 57, for molding lids 21, is shown in FIGS. 13 and 14. Mold 57 has a body 58 and a cover 59 joined together by a hinge 60.

Body 58 is formed of epoxy resin and has an oversize cavity 61 partially filled by a silicon rubber lining or bladder 62 which is supported to define a recess 62r which is part of a lid molding cavity. Cover 59, also formed of epoxy resin, has an oversize cavity 63 partially filled by a silicon rubber lining or bladder 64 which is supported to define a recess 64r which with recess 62r forms a finish molding cavity for a lid 21 when the mold 57 is closed. The silicon rubber linings 62 and 64 may be made through use of patterns in the manner explained in the foregoing descriptions of the molds of FIGS. 9–12. A hinge pin aperture forming rod 262 is slidably mounted in a bore in cover 59 and advanceable to during molding extend through the cavity in the locations when hinge pin apertures 35 are desired in hinge lugs 30, and retractable to facilitate removal of a molding from the mold.

The method of making the urethane seat and lid in accordance with my invention is as follows.

A preformed stiffening portion 22, having a volume of about 45 cubic inches, is first molded, using a mold 37 shown in FIGS. 9 and 10. The open mold 37 is placed flat on a support and rod 26r advanced to span the cavity 44. The exposed face of lining 43 is coated, as by spraying, with a layer of a suitable mixture of urethane resin, catalyst and pigment to produce, when cured, a durable seat surface finish layer 28 of desired color and thickness. When the coating on the lining 43 is tacky or drier, the mold cavity 43c is charged with approximately 460 grams of a urethane molding composition consisting of 100 parts by weight of urethane resin, which may be of dunnage quality, and 68 parts by weight of isocyanate, by pouring the molding composition into the cavity 43c. Thereafter the cover 39 is swung closed and the mold 37 clamped shut. The molding is permitted to cure, excess charge being released through bleed-off holes 391. When the molding is cured the rod 26r is retracted, the mold unclamped and opened. The molding, a preformed stiffener portion 22, is then removed from the mold alone or accompanied by the lining 43. If accompanied by the lining 43, same is separated from the molding, as by flexing or otherwise, and replaced in proper position in cavity 41 to place the mold in condition for its next use.

The preformed stiffener portion 22 removed from the mold has the finish surface 28 on the bottom side, including the bumper portions 24, and same extends up on the edges as well to the plane $x$—$x$ in FIG. 7.

The open seat mold 45 is placed flat upon a support and the exposed surfaces of lining 50, rings 51 and ring 52 are coated, as by spraying, with a like layer 28 of the same mixture of urethane resin, catalyst and pigment as was applied to lining 43. When the coating layer 28 is tacky or drier the stiffener 22 is secured on cover 47 by fasteners 56 with its edge portions overlapping the coated silicon rubber rings 51 and 52. Mold cavity 50c is charged with approximately 500 grams of a urethane molding composition consisting of a mixture of 100 parts by weight of urethane resin and 52 parts by weight of isocyanate. Cover 47 is closed, rod 261 advanced to extend through aperture 26 in lug 25 and to span the mold cavity between the lug 25 and liner 50 and mold 45 is clamped shut. Any excess of the urethane charge is removed through bleed-off holes 461. The urethane charge and coating are permitted to cure, the charged material bonding to the surfaces of stiffener 22 exposed in the cavity and the coating layer 28. Coating layer 28 sprayed on the rings 51 and 52 and overlain by stiffener 22 cures and bonds to the like layer 28 material of the stiffener to produce a continuous exterior layer 28. When cured, the finished seat 20 is removed from the mold by unclamping the mold, retracting rod 261, opening the mold and removing the seat by itself or accompanied by lining 50 and/or rings 51, 52. The lining 50 and rings 51, 52 can be separated from the molded seat as by flexing or otherwise and returned to their places in the mold for its next use. The cavity in mold 45, like the molded seat, has a volume of approximately 180 cubic inches.

The open lid mold 57 is placed flat on a support and the exposed surfaces of linings 62 and 64 are coated, as by spraying, with a like layer of the same mixture of urethane resin, catalyst and pigment used to form layer 28 of the seat. Rod 262 is advanced to extend through the mold cavity portions in which lugs 30 are to be formed and the mold is charged by pouring into recess 62r approximately 500 grams of a mixture consisting of 100 parts by weight of urethane resin and 67-½ parts by weight of isocyanate. The charged mold 57 is closed and clamped. Any excess of urethane charge exits through bleed-off holes 591. When the molding has cured, the rod 262 is retracted, the mold unclamped, opened and the molding removed in like manner as was described in connection with the seat and preformed stiffener. The cavity defined by linings 62 and 64 in lid mold 57, like the molded lid 21, has a volume of approximately 118 cubic inches.

The urethane resin used in each instance is preferably of high quality, except in the case where dunnage grade may be used in the preformed stiffener 22 as mentioned earlier. The urethane resin containing mixtures may also have other ingredients included in them and among such ingredients would be those which contribute to sanitary properties by bacteriostatic and fungistatic action, for example, products sold under the trademark COROBEX by Royce Chemical Company of East Rutherford, New Jersey.

The toilet seat, lid, molds and method of making the seat and lid illustrated in the drawings and described above are illustrative embodiments of my invention and subject to modification without departing from the spirit and scope of the appended claims.

Having described my invention, what I claim as new and desire to secure by letters patent is:

1. A resilient synthetic resin toilet seat comprising in combination a resilient preformed stiffening portion having an internal foamed core enveloped in an unfoamed self-skin and a cushioning portion having an internal foamed core enveloped in a tough but resilient self-skin, said cushioning portion unitarily extending from the top and sides of said stiffening portion with the portion of the self-skin of the cushioning portion overlying the portion of the self-skin of the top and sides of the stiffening portion being unitary with the self-skin of the top and sides of the stiffening portion and a continuous unitary outward self-skin of the seat being formed by other portions of the self-skin of the cushioning portion in combination with the other portions of the self-skin of the stiffening portion.

2. A seat in accordance with claim 1 characterized by said seat having an upright inward facing edge face and being of a cross-section which when compressed under use load applied to the upper surface of the seat bulges at the inner edge of the seat such that the upright face is reduced while the upper surface of the seat is augmented in area adjacent the said bulge.

3. A seat in accordance with claim 1 characterized by said seat having an outwardly upwardly facing outer edge surface, an upper surface, and an upright inward facing edge face and being of a cross-section which when compressed under use load applied to the upper surfae of the seat bulges at the inner edge of the seat such that the upright face is reduced while the upper surface of the seat is augmented in area adjacent the said bulge and resists bulging outwardly at the outer edge of the seat.

4. A seat in accordance with claim 1 characterized by said seat having an upright inward facing edge face and being of a cross-section which when compressed under use load applied to the upper surface of the seat bulges at the inner edge of the seat such that the upright face is reduced while the upper surface of the seat is augmented in area adjacent the said bulge and resists bulging outwardly at the outer edge of the seat.

5. A seat in accordance with claim 1 characterized by said preformed stiffening portion having resilient bumper portions protruding from the underside thereof and enveloped in the self-skin of the stiffening portion for engaging the rim of a toilet bowl.

6. A resilient synthetic resin toilet seat comprising in combination a preformed resilient stiffening portion having an internal foamed core enveloped in an unfoamed self-skin, a cushioning portion having an internal foamed core enveloped in a tough but resilient self-skin, said cushioning portion unitarily extending from the top and sides of said stiffening portion with the portion of the self-skin of the cushioning portion overlying the portion of the self-skin of the top and sides of the stiffening portion being unitary with the self-skin of the top and sides of the stiffening portion, and a continuous unitary outward self-skin of the seat being formed by other portions of the self-skin of the cushioning portion in combination with the other portions of the self-skin of the stiffening portion and an integral pigmented unitary overlayer of synthetic resin forming the exterior of said seat.

7. A resilient synthetic resin toilet seat lid comprising a body portion having an integral hinge lug having a transverse hinge pin receiving aperture, said body in its central portion having an internal foam core and an unfoamed tough but resilient flexible self-skin enveloping said core, said aperture being surrounded and defined by an integral portion of the unfoamed tough but resilient self-skin of the lid body, the density of the body being greatest in the self-skin and decreasing inwardly to the central portion of the core thereof.

8. A resilient synthetic resin toilet seat lid comprising a body portion having an integral hinge lug having a transverse hinge pin receiving aperture, said body in its central portion having an internal foam core and an unfoamed tough but resilient flexible self-skin enveloping said core, said aperture being surrounded and defined by an integral portion of the unfoamed tough but resilient self-skin of the lid body, the density of the body being greatest in the self-skin and decreasing inwardly to the central portion of the core thereof, and a pigmented unitary integral overlayer of synthetic resin forming the exterior of said lid being mold formed thereon concurrently with the molding of said lid.

9. A lidded toilet seat comprising in combination a resilient unitary molded preformed seat stiffening portion having an unfoamed self-skin and an internal foamed core, a seat cushioning portion having an unfoamed self-skin and an internal foamed core, the self-skin of said cushioning portion being tough but resilient and unitary with said core, said cushioning portion extending unitarily from the top and sides of said stiffening portion with the portion of the self-skin of the cushioning portion overlying the portion of the self-skin of the top and sides of the stiffening portion being unitary with the self-skin of the top and sides of the stiffening portion, and a unitary outward self-skin of the seat being formed by other portions of the self-skin of the cushioning portion in combination with the other portions of the self-skin of the stiffening portion, said seat having at least one transverse hinge pin receiving aperture surrounded and defined by an integral portion of the unfoamed tough but resilient self-skin of the seat, a lid having a unitary body portion, the lid body having a tough but flexible self-skin, a foamed core enveloped therein and a pair of spaced integral hinge lugs each having a transverse hinge pin receiving aperture surrounded and defined by an integral portion of the unfoamed tough but resilient self-skin of the lid, the marginal portion of the lid body being flexible, a hinge pin received in said hinge pin receiving apertures and pivotally joining said lid and seat so said lid may be swung to a position in which its flexible marginal portions lie cooperatively upon the cushion portion of the seat and with the foamed core portion in the lid body being positioned above the opening in the seat, whereby the lid and seat cofunction to provide resiliently cushioned seating.

10. A lidded toilet seat in accordance with claim 9 characterized by said preformed stiffening portion having the properties of a urethane molding made by charging a mold at a rate of approximately 9.75 to 10.75 grams per cubic inch of mold cavity volume with a molding composition comprising a foamable mixture of 100 parts by weight of urethane resin and 68 parts by weight of isocyanate.

11. A lidded toilet seat in accordance with claim 9 characterized by said seat cushioning portion having the properties of a urethane molding made by charging a mold at a rate of approximately 3.4 to 4.0 grams per cubic inch of mold cavity volume not occupied by the preformed stiffening portion, with a molding composition comprising a foamable mixture of 100 parts by weight of urethane resin and 52 parts by weight of isocyanate.

12. A lidded toilet seat in accordance with claim 9 characterized by said lid body portion having the properties of a urethane molding made by charging a mold at a rate of approximately 4.1 to 4.3 grams per cubic inch of mold cavity volume with a molding composition comprising a foamable mixture of 100 parts by weight of urethane resin and 67.5 parts by weight of isocyanate.

13. A seat in accordance with claim 9 characterized by said preformed stiffening portion having resilient bumper portions protruding from the underside thereof and enveloped in the self-skin of the stiffening portion for engaging the rim of a toilet bowl.

14. A lidded toilet seat comprising in combination a resilient unitary molded preformed seat stiffening portion having an unfoamed self-skin and an internal self-skin and an internal foamed core, a seat cushioning portion having an unfoamed self-skin and an internal foamed core, the self-skin of said cushioning portion being tough but resilient and unitary with said core, said cushioning portion extending unitarily from the top and sides of said stiffening portion with the portion of the self-skin of the cushioning portion overlying the portion of the self-skin of the top and sides of the stiffening portion being unitary with the self-skin of the top and sides of the stiffening portion and a unitary outward self-skin of the seat being formed by other portions of the self-skin of the cushioning portion in combination with the other portions of the self-skin of the stiffening portion, and an integral pigmented unitary overlayer of synthetic resin forming the exterior of said molded seat, said seat having at least one transverse hinge pin receiving aperture surrounded and defined by an integral portion of the unfoamed tough but resilient self-skin of the seat, a lid having a unitary body portion, the lid body having a tough but flexible self-skin, a foamed core enveloped therein, a pair of spaced integral hinge lugs each having a transverse hinge pin receiving aperture surrounded and defined by an integral portion of the unfoamed tough but resilient self-skin of the lid, and an integral pigmented unitary overlayer of synthetic resin forming the exterior of said molded lid body, marginal portions of the lid body being flexible, a hinge pin received in said hinge pin receiving apertures and pivotally joining said lid and seat so said lid may be swung to a position in which its flexible marginal portions lie cooperatively upon the cushion portion of the seat and with the foamed core portion in the lid body being positioned above the opening in the seat, whereby the lid and seat cofunction to provide resiliently cushioned seating.

15. A seat in accordance with claim 9 characterized by said seat being of a cross-section having an upright inward facing edge face which when compressed under use load applied to the upper surface of the seat bulges at the inner edge of the seat such that the upright face is reduced while the upper surface of the seat is augmented in area adjacent the said bulge and resists bulging outwardly at the outer edge of the seat.

16. A resilient synthetic resin toilet seat comprising in combination a preformed stiffening portion having an internal foamed core enveloped in an unfoamed self-skin and with density of the stiffening portion being greatest in the self-skin and decreasing inwardly to the central portion of the core, and a cushioning portion having an internal foamed core enveloped in a tough but resilient self-skin, said cushion portion being unitarily mold formed on said stiffening portion and extending from the top and sides of said stiffening portion with the portion of the self-skin of the cushioning portion overlying the portion of the self-skin of the top and sides of the stiffening portion being unitary with the self-skin of the top and sides of the stiffening portion, and with density of the cushion portion being greatest in the self-skin and decreasing inwardly to the central portion of the core thereof and a continuous unitary outward self-skin of the seat being formed by other portions of the self-skin of the cushioning portion in combination with the other portions of the self-skin of the stiffening portion.

17. A seat in accordance with claim 16 characterized by said seat having an outwardly upwardly facing outer edge surface, an upper surface, and an upright inward facing edge face and being of a cross-section which when compressed under use load applied to the upper surface of the seat bulges at the inner edge of the seat such that the upright face is reduced while the upper surface of the seat is augmented in area adjacent the said bulge and resists bulging outwardly at the outer edge of the seat.

18. A seat in acordance with claim 16 characterized by said preformed stiffening portion having resilient bumper portions protruding from the underside thereof and enveloped in the self-skin of the stiffening portion for engaging the rim of a toilet bowl.

19. A seat in accordance with claim 16 characterized by said seat having an upright inward facing edge face and being of a cross-section which when compressed under use load applied to the upper surface of the seat bulges at the inner edge of the seat such that the upright face is reduced while the upper surface of the seat is augmented in area adjacent the said bulge.

20. A seat in accordance with claim 16 characterized by said seat being of a cross-section having an upright inward facing edge face which when compressed under use load applied to the upper surface of the seat bulges at the inner edge of the seat such that the upright face is reduced while the upper surface of the seat is augmented in area adjacent the said bulge and resists bulging outwardly at the outer edge of the seat.

21. A resilient synthetic resin toilet seat comprising in combination a preformed stiffening portion having an internal foamed core enveloped in an unfoamed self-skin and with density of the stiffening portion being greatest in the self-skin and decreasing inwardly to the central portion of the core, and a cushioning portion having an internal foamed core enveloped in a tough but resilient self-skin, said cushion portion being unitarily mold formed on said stiffening portion and extending from the top and sides of said stiffening portion with the portion of the self-skin of the cushioning portion overlying the portion of the self-skin of the top and sides of the stiffening portion being unitary with the self-skin of the top and sides of the stiffening portion, and with density of the cushion portion being greatest in the self-skin and decreasing inwardly to the central portion of the core thereof, a continuous unitary outward self-skin of the seat being formed by other portions of the self-skin of the cushioning portion in combination with the other portions of the self-skin of the stiffening portion and an integral pigmented unitary overlayer of synthetic resin forming the exterior of said seat and being mold formed on the exterior of the seat as the cushion portion thereof is mold formed on said stiffening portion.

* * * * *

UNITED STATES PATENT OFFICE
CERTIFICATE OF CORRECTION

Patent No. 3,988,789   Dated   November 2, 1976

Inventor(s) George W. Blount

It is certified that error appears in the above-identified patent and that said Letters Patent are hereby corrected as shown below:

[56] References Cited

The issue date of 3,520,005 Downes should be 7/1970;
Add the reference -- Handbook of Foamed Plastics by R. Bender, 1965 --

[57] ABSTRACT

In the third line "infoamed" should be -- unfoamed --

SPECIFICATION

Column 3, line 30, "secod" should be -- second --

Column 4, line 18, delete "and"

Column 7, line 13, "surfae" should be -- surface --

Column 9, lines 1 and 2, delete "self-skin and an internal"

Signed and Sealed this

Twenty-second Day of February 1977

[SEAL]

Attest:

RUTH C. MASON
Attesting Officer

C. MARSHALL DANN
Commissioner of Patents and Trademarks